United States Patent
DiFoggio (10) Patent No.: US 12,203,893 B2
(45) Date of Patent: Jan. 21, 2025

(54) FLUID DENSITY FROM TUNABLE ACOUSTIC IMPEDANCE MATCHING

(71) Applicant: Baker Hughes Oilfield Operations LLC, Houston, TX (US)

(72) Inventor: Rocco DiFoggio, Houston, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 259 days.

(21) Appl. No.: 17/976,156

(22) Filed: Oct. 28, 2022

(65) Prior Publication Data

US 2024/0142411 A1    May 2, 2024

(51) Int. Cl.
- G01N 29/028 (2006.01)
- E21B 49/08 (2006.01)
- G01N 29/024 (2006.01)
- G01N 29/24 (2006.01)

(52) U.S. Cl.
CPC ........... G01N 29/24 (2013.01); E21B 49/081 (2013.01); G01N 29/024 (2013.01); G01N 29/028 (2013.01); G01N 2291/018 (2013.01); G01N 2291/02818 (2013.01)

(58) Field of Classification Search
CPC .... G01N 29/24; G01N 29/024; G01N 29/028; G01N 2291/018; G01N 2291/02818; E21B 47/107; E21B 49/081; E21B 49/0875; E21B 49/10
See application file for complete search history.

(56) References Cited

U.S. PATENT DOCUMENTS

| | | | |
|---|---|---|---|
| 5,741,962 A | 4/1998 | Birchak et al. | |
| 6,480,118 B1 * | 11/2002 | Rao | E21B 47/00 73/152.16 |
| 7,024,917 B2 | 4/2006 | DiFoggio | |
| 7,523,646 B2 | 4/2009 | Klun | |
| 7,614,302 B2 | 11/2009 | DiFoggio | |
| 7,614,312 B2 | 11/2009 | DiFoggio | |
| 7,921,691 B2 | 4/2011 | DiFoggio | |

(Continued)

OTHER PUBLICATIONS

Chen et al., "A Review of Tunable Acoustic Metamaterials"; Applied Sciences; Aug. 28, 2018; 21 pages.

(Continued)

*Primary Examiner* — Suman K Nath
(74) *Attorney, Agent, or Firm* — CANTOR COLBURN LLP (57) ABSTRACT

Downhole tools for measuring properties of a fluid include a sample chamber configured to receive the fluid, a field responsive material ("FRM") arranged with an interface between the field responsive material and the fluid under test in the sample chamber. The field responsive material is tunable to change an acoustic impedance of the field responsive material in response to application of an applied field. A field generator is arranged in relation to the field responsive material, the field generator configured to generate and apply a field to the field responsive material. An acoustic transducer is arranged to direct acoustic energy into and through the field responsive material toward the interface between the field responsive material and the fluid and configured to detect reflections of acoustic energy that reflect from the interface.

20 Claims, 4 Drawing Sheets

(56) References Cited

U.S. PATENT DOCUMENTS

| | | | |
|---|---|---|---|
| 9,594,057 B2 | 3/2017 | DiFoggio | |
| 2005/0204808 A1 | 9/2005 | DiFoggio | |
| 2007/0227241 A1 | 10/2007 | DiFoggio | |
| 2009/0187391 A1* | 7/2009 | Wendt | G01V 11/00 702/14 |
| 2015/0204819 A1 | 7/2015 | DiFoggio | |
| 2016/0025884 A1 | 1/2016 | DiFoggio | |
| 2020/0209193 A1* | 7/2020 | Swett | E21B 47/103 |

OTHER PUBLICATIONS

Cheng et al.; "Sound insulation effect of magnetorheological fluid as a function of magnetic field strength and direction";Materials Research Letters, 10:5, 310-317, DOI: 10.1080/21663831.2022.2050431 (2022).

Dawson et al., "Acoustic Impedance Matching with Porous Aluminium"; IEEE Sensors 2009 Conference; Oct. 2009; 5 pages.

Ding, et al. "The energy reflection coefficient of electrorheological fluid with continuously changing acoustic impedance"; Int J Mech Mater Des 6, 135-145 (2010). https://doi.org/10.1007/s10999-010-9115-5; 11 pages.

Dong et al., "Electroheological Elastomers"; INTECH; http://dx.doi.org/10.5772/intechopen.68396; 2017; 19 pages.

Dong et al.; "Electrorheological Characteristics of Poly(diphenylamine)/magnetite Composite-Based Suspension"; Materials; Deptember 2019; 18 pages.

Guicking et al., "Electrorheological Fluids as an Electrically Controllable Acoustic Medium: I. Experimental Arrangement and Application to an Absorber of Underwater Sound"; ACUSTICA, vol. 88 (2002), 11 pages.

International Search Report and Written Opinion for International Application No. PCT/US2023/077850; Date of Search: Feb. 22, 2024; 7 pages.

Kim et al., "Material characterization of ER fluids at high frequency"; Journal of Sound and Vibration, vol. 267, Issue 1, Oct. 9, 2003; pp. 57-65.

Kim et al., "Material characterization of MR fluid at high frequencies"; Journal of Sound and Vibration, vol. 283, Issues 1-2, May 6, 2005; pp. 121-133.

Korobko et al.; "Influence of an external electric field on the propagation of ultrasound in electrorheological suspensions"; Journal of Engineering Physics 48, 153-157 (1985). https://doi.org/10.1007/BF00871863; 5 pages.

Li et al,. "The control of ultrasonic transmission by the metamaterials structure of electrorheological fluid and metal foam"; iopscience.iop.org; Aug. 2017; 13 pages.

Liu et al., "Electrorheology of filled silicone elastomers"; Journal of Rheology vol. 45, Issue 3(2001); https://doi.org/10.1122/1.1366716; Abstract (2 pages).

Roy et al., "Ultrasonic propagation in electrorheological suspensions"; The Journal of the Acoustical Society of America 87, S85 (1990); doi: 10.1121/1.2028401.

Shen et al.; "Acoustic velocity and attenuation coefficient of magnetorheological fluidsunder electromagnetic fields"; Applied Acoustics, vol. 107, Jun. 2016, pp. 27-33.

Sun et al, "Deformation Dependent Sound Absorption Property of a Novel Magnetorheological Membrane Sound Absorber"; Frontiers in Material; Oct. 30, 2020; 10 pages.

Tam et al., "New Electrorheological Fluid: Theory and Experiment"; Physical Review Letters, vol. 78, No. 15, Apr. 14, 1997; 4 pages.

Wang et al. "Measurement of acoustic velocity and attenuation of electrorheological fluids"; Spawda, 2016.

Wang et al., "Performance evaluation of electrorheological fluid using acoustic method"; Smart Materials and Structures, vol. 25, No. 12; Nov. 10, 2016; Abstract (1 page).

Wang et al., "The shear wave properties of ERF"; Spawda 2015; Abstract (3 pages).

Yu et al., "Distance Characteristics of Sound Wave Attenuation in ER Fluids"; Telkominka, vol. 11, No. 2, Feb. 2013; 5 pages.

\* cited by examiner

FLUID DENSITY FROM TUNABLE ACOUSTIC IMPEDANCE MATCHING

BACKGROUND

The present disclosure relates to wellbore evaluation operations. More specifically, the present disclosure relates to apparatuses and methods for ascertaining fluid density information of formation fluids.

Downhole fluid testing instruments have been developed with extendable sampling probes that engage a borehole wall and withdraw fluid samples from a formation of interest. Such testing instruments may be used to measure pressure of the fluid within the formation along with obtaining other information regarding a formation and/or fluids thereof. Typically, these downhole instruments comprise an internal draw-down piston that is reciprocated hydraulically or electrically for drawing fluid from the formation to the instrument.

Generally, the downhole fluid testing devices incorporate a fluid circuit for the sampling system which requires the fluid extracted from the formation. Downhole fluid mass density is a measurement that may be important for downhole operations and/or recovery or extraction of fluids from downhole formations. In accordance with some current systems, an embedded electrode piezoelectric tuning fork density-viscosity sensor may be employed. However, such systems may suffer from longevity issues and thus long-term use and/or frequent repair/replacement may be required. An all-metal resonator solution may provide some advantages and may be driven through a metal membrane by a piezoelectric. However, improved fluid analysis tools may provide advantages over the existing mechanisms and systems.

SUMMARY

According to some embodiments, downhole tools for measuring properties of a fluid are provided. The downhole tools include a sample chamber configured to receive the fluid being tested, a field responsive material arranged with an interface between the field responsive material ("FRM") and the fluid in the sample chamber. The field responsive material is tunable to change an acoustic impedance of the field responsive material in response to application of an applied field. A field generator is arranged in relation to the field responsive material, the field generator configured to generate and apply a field to the field responsive material. An acoustic transducer is arranged to direct acoustic energy into and through the field responsive material toward the interface between the field responsive material and the fluid and configured to detect reflections of acoustic energy that reflect from the interface.

According to some embodiments, methods for determining fluid properties with a downhole tool are provided. The downhole tool includes a sample chamber, a field responsive material, an acoustic transducer, and a field generator. The methods include filling the sample chamber with a fluid being tested, applying a field to the field responsive material, using the field generator, to cause an acoustic impedance of the field responsive material to change to a predetermined acoustic impedance, directing acoustic energy through the field responsive material, from the acoustic transducer to an interface between the field responsive material and the fluid in the sample chamber, monitoring acoustic energy reflections from the interface to determine an acoustic impedance of the fluid in the sample chamber, changing the applied field to alter the acoustic impedance of the field responsive material, determining an acoustic impedance of the field responsive material that has a minimum amount of acoustic energy reflection, and obtaining an acoustic impedance of the fluid in the sample chamber from the determined acoustic impedance of the field responsive material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. Modern bottom hole assemblies (BHAs) are composed of several distributed components, such as sensors and tools, with each component performing data acquisition and/or processing of a special purpose. During a drilling operation, sensors and detectors may be used to determine the nature of a surrounding formation and/or to determine if the location of the borehole is passing through an expected formation and/or within a specification formation (e.g., for production purposes). Such sensors and detectors may also or alternatively be used to determine physical properties relevant for drilling operations, such as, and without limitation, pressure, temperature, mechanical loading (e.g., accelerations, bending moments, torsional moments, axial forces, etc.), or directional information, such as drift/inclination or direction/azimuth.

Figure 1:
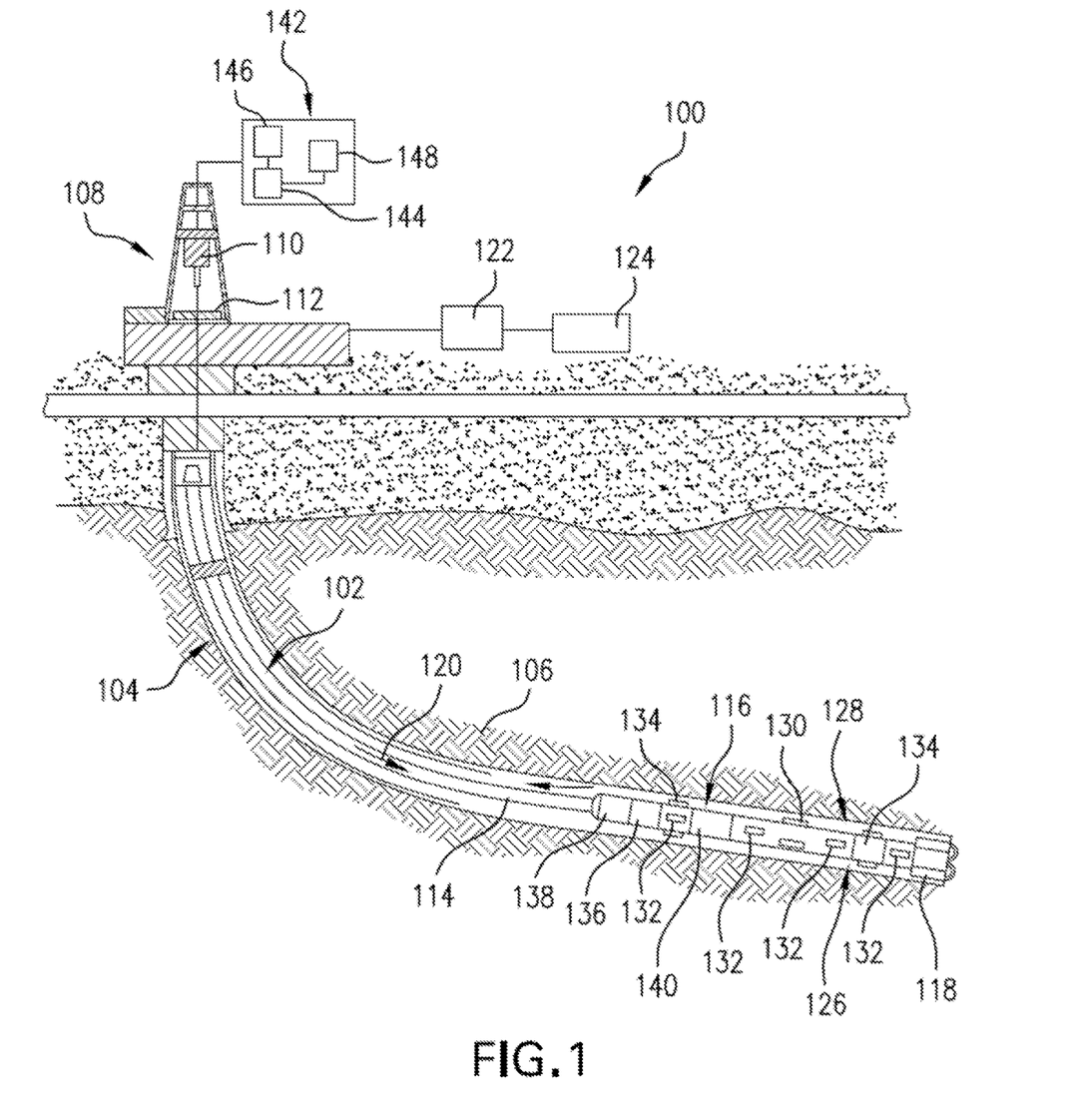
FIG. 1 depicts a schematic illustration of a wellbore operation system that can incorporate embodiments of the present disclosure.

FIG. 1 illustrates an embodiment of a system 100 for performing an energy industry operation (e.g., subsurface drilling, measurement, stimulation, and/or production). The system 100 includes a borehole string 102 that is shown disposed in a well or borehole 104 that penetrates at least one earth formation 106 during a drilling or other downhole operation. As described herein, "borehole" or "wellbore" refers to a hole that makes up all or part of a drilled well. It is noted that the borehole 104 may include vertical, deviated, and/or horizontal sections, and may follow any suitable or desired path. As described herein, "formations" refer to the various features and materials (e.g., geological material) that may be encountered in a subsurface environment and surround the borehole 104.

The borehole string 102 is operably connected to a surface structure or surface equipment such as a drill rig 108, which includes or is connected to various components such as a surface drive 110 (also referred to as top drive) and/or rotary table 112 for supporting the borehole string 102, rotating the borehole string 102, and lowering string sections or other downhole components into the borehole 104. In one embodiment, the borehole string 102 is a drill string including one or more drill pipe sections 114 that extend downward into the borehole 104 and is connected to one or more downhole components (downhole tools), which may be configured as a bottomhole assembly (BHA) 116. The BHA 116 may be fixedly connected to the borehole string 102 such that rotation of the borehole string 102 causes rotation of the BHA 116.

The BHA 116 includes a disintegrating device 118 (e.g., a drill bit), which in this embodiment is driven from the surface, but may be driven from downhole (e.g., by a downhole mud motor or turbine). The system 100 may include components to facilitate circulating fluid 120, such as drilling mud, through an inner bore of the borehole string 102 and an annulus between the borehole string 102 and a wall of the borehole 104. For example, in this illustrative embodiment, a pumping device 122 is located at the surface to circulate the fluid 120 from a mud pit or other fluid source 124 into the borehole 104 as the disintegrating device 118 is rotated (e.g., by rotation of the borehole string 102 and/or a downhole motor).

In the illustrative embodiment shown in FIG. 1, the system 100 can include a steering assembly 126 configured to steer or direct a section of the borehole string 102 and the disintegrating device 118 along a selected path. The steering assembly 126 may have any configuration suitable to direct or steer the drill string 102. Examples of steering assemblies include, without limitation, steerable motor assemblies (e.g., bent housing motor assemblies), turbines, and rotary steerable systems.

In one non-limiting embodiment, the steering assembly 126 is configured as a rotary steering assembly forming the BHA 116 or part of the BHA 116. The steering assembly 126 includes a non-rotating or slowly-rotating sleeve 128 that includes one or more radially extendable pads 130 (extendable in a direction perpendicular to a longitudinal axis of the sleeve). The pads 130 may be located at different circumferential locations on the sleeve 128 and are adjustable individually or in combination to deflect the disintegrating device 118 by engaging the wall of the borehole 104.

The system 100 may also include a controller configured to operate or control operation of the pads 130 based on directional information derived from directional sensors located in the BHA 116 and/or the borehole string 102. The directional sensor(s) may be arranged at, in, or near the steering assembly 126. The directional sensor(s) can include one or more gyroscopes (e.g., gyroscope sensors or earth rate sensor sensors), and also include one or more magnetometers (i.e., magnetic field sensors) and/or one or more accelerometers (e.g., acceleration sensors and/or gravitational sensors).

In one embodiment, the system 100 includes one or more sensor assemblies 132 configured to perform measurements of parameters related to position and/or direction of the borehole string 102, the disintegrating device 118, and/or the steering assembly 126. As shown in FIG. 1, the sensor assemblies 132 may be located at one or more of various locations, such as on the sleeve 128, at or near the disintegrating device 118, and/or on other components of the borehole string 102 and/or the BHA 116. For example, a sensor assembly 132 can be located on one or more stabilizer sections 134 of the steering assembly 126. The sleeve 128 may be coupled to the borehole string 102 by a bearing assembly or other mechanism that allows rotation of the sleeve independent of the rotation of the borehole string, as will be appreciated by those of skill in the art.

The system 100 may include one or more of various tools or components configured to perform selected functions downhole such as performing downhole measurements/ survey s (e.g., formation evaluation measurements, directional measurements, etc.), facilitating communications (e.g., mud pulser, wired pipe communication sub, etc.), providing electrical power and others (e.g., mud turbine, generator, battery, data storage device, processor device, modem device, hydraulic device, etc.). For example, the steering assembly 126 can be connected to one or more sensor devices, such as a gamma ray imaging tool 136. Such gamma ray imaging tool 136 may be used to measure formation density, for example.

In one embodiment, the system 100 includes a measurement device such as a logging while drilling (LWD) tool (e.g., for formation evaluation measurements) or a measurement while drilling (MWD) tool (e.g., for directional measurements), generally referred to as while-drilling tool 138. Examples of LWD tools include nuclear magnetic resonance (NMR) tools, resistivity tools, gamma (density) tools, pulsed neutron tools, acoustic tools, and various others. Examples of MWD tools include tools measuring pressure, temperature, or directional data (e.g., magnetometer, accelerometer, gyroscope, etc.). The steering assembly 126 or the system 100 can include other components, such as a telemetry assembly (e.g., mud pulser, wired pipe communication sub, etc.) or other downhole and/or surface components, systems, or assemblies.

In one non-limiting embodiment, during drilling, the sleeve 128 does not rotate or rotates at a rate that is less than the rotational rate of the disintegrating device 118 and other components of the steering assembly 126 and rotary table 112 or surface drive 110. The rate of rotation of the sleeve 128 may be denoted herein as "slow rotation." It is noted that "slow" rotation is intended to indicate a rotational rate that is less than the drilling rotational rate and is not intended to be limiting to any specific rate. A "slowly-rotating" sleeve is a sleeve that rotates at the slow rotation rate.

The sleeve 128 can rotate at any suitable slow rotation rate that is less than the drilling rotation rate. In one embodiment, slow rotation of the sleeve 128 is a rate between about 1 and 10 revolutions per hour (RPH). In one embodiment, slow rotation is between about 10 and 50 RPH (60°/minute and 300°/minute). In yet another embodiment, slow rotation is about 1 and 50 RPH (6°/minute and 300°/minute).

One or more downhole components and/or one or more surface components may be in communication with and/or controlled by a processor such as a downhole processing unit 140 and/or a surface processing unit 142. The downhole processing 140 may be parts of the BHA 116 or may be otherwise arranged on or part of or disposed on the borehole string 102. The surface processing unit 142 (and/or the downhole processing unit 140) may be configured to perform functions such as controlling drilling and steering, controlling the flow rate and pressure of the fluid 120, controlling weight on bit (WOB), controlling rotary speed (RPM) of the rotary table 112 or the surface drive 110, transmitting and receiving data, processing measurement data, and/or monitoring operations of the system 100. The surface processing unit 142, in some embodiments, includes an input/output (I/O) device 144 (such as a keyboard and a monitor), a processor 146, and a data storage device 148 (e.g., memory, computer-readable media, etc.) for storing data, models, and/or computer programs or software that cause the processor to perform aspects of methods and processes described herein.

In one non-limiting embodiment, the surface processing unit 142 is configured as a surface control unit which controls various parameters such as rotary speed, weight-on-bit, fluid flow parameters (e.g., pressure and flow rate), and other parameters or aspects of the system 100. The downhole processing unit 140, in some embodiments, may be a directional measurement controller or other processing device that controls aspects of operating the sensor assemblies 132, acquiring measurement data, and/or estimating directional parameters. The downhole processing unit 140 may also include functionality for controlling operation of the steering assembly 126 and/or other downhole components, assemblies, or systems. In one non-limiting embodiment, the method and processes described herein may be performed in the downhole processing unit 140 located within the borehole string 102 or the BHA 116.

In the embodiment of FIG. 1, the system 100 is configured to perform a drilling operation and a downhole measurement operation, and the borehole string 102 is a drill string. However, embodiments described herein are not so limited and may have any configuration suitable for performing an energy industry operation that includes or can benefit from directional measurements (e.g., completion operation, fracturing operation, production operation, re-entry operation, etc.).

Figure 2:
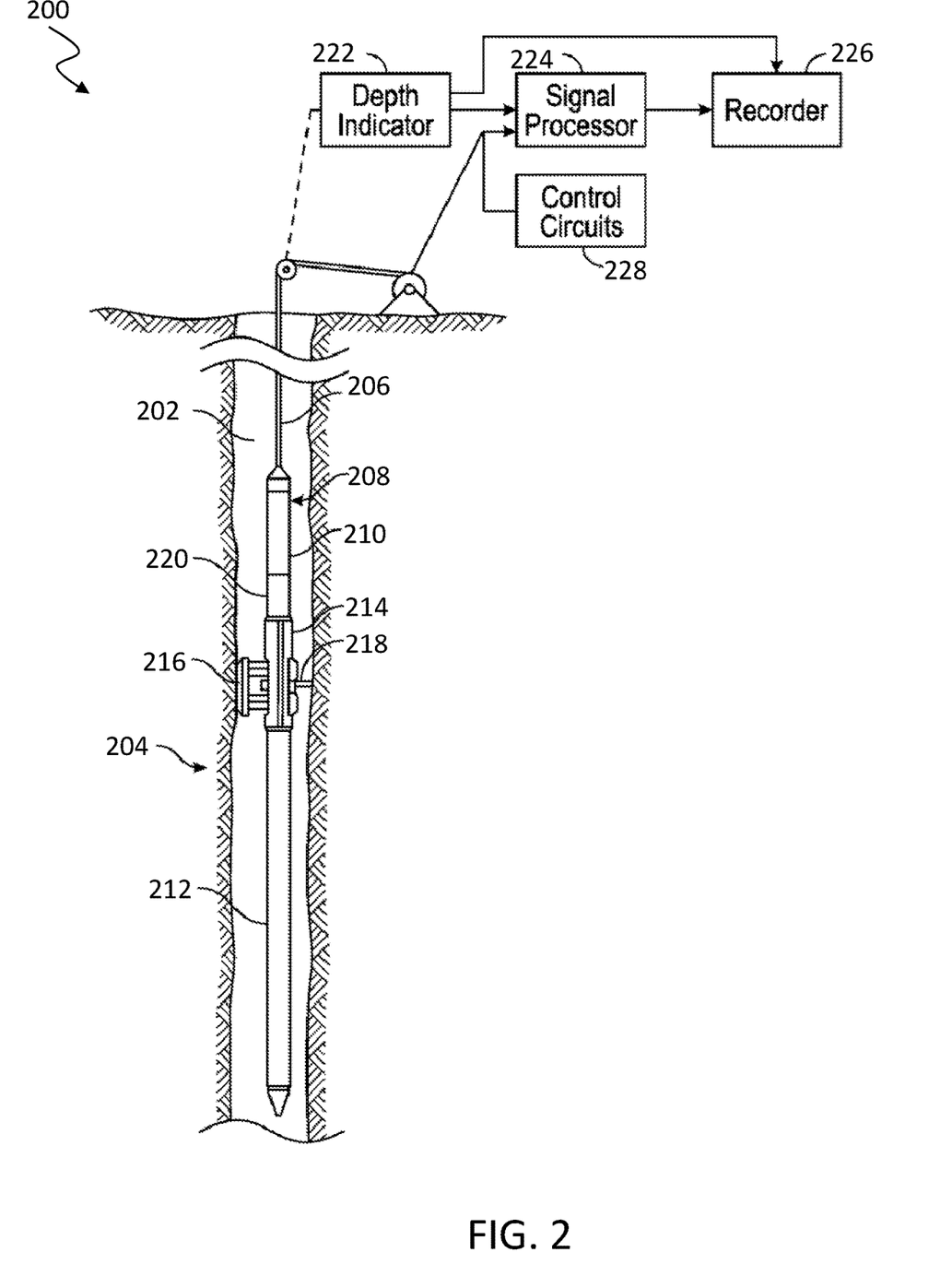
FIG. 2 depicts a schematic illustration of a downhole operation system that can incorporate embodiments of the present disclosure.

FIG. 2 illustrates a downhole system 200 that may incorporate embodiments of the present disclosure. As shown, a borehole 202 intersects a portion of an earth formation 204. Disposed within the borehole 202 by means of a conveyance device 206 is a sampling and measuring instrument 208. The conveyance device 206 may be a carrier, drill string, coiled tubing, a slickline, an e-line, a wireline, etc., as will be appreciated by those of skill in the art. The sampling and measuring instrument 208 includes hydraulic power system 210, a fluid sample storage section 212, and a sampling mechanism section 214. Sampling mechanism section 214 includes selectively extensible well-engaging pad member 216, a selectively extensible fluid admitting sampling probe member 218, and a bi-directional pumping member 220. It will be appreciated that the specific configuration of the components with respect to one another may vary from the illustrative configuration, without departing from the scope of the present disclosure.

In operation, the sampling and measuring instrument 208 is positioned within the borehole 202 via a conveyance device 206 (e.g., by winding or unwinding the conveyance device 206 from a hoist or other structure (not shown)). At the surface, the downhole system includes various surface components, including, without limitation, a depth indicator 222, a signal processor 224, a recorder 226, and control circuits 228. The various surface components may be arranged in operable communication with the downhole components, including the sampling and measuring instrument 208. The depth indicator 222 may be configured to monitor and measure a depth or location of the sampling and measuring instrument 208 within the borehole 202. Control signals from control circuitry of the control circuit 228 may be transmitted through electrical conductors contained within the conveyance device 206 to the sampling and measuring instrument 208 to send instructions thereto. The signal processor 224 and recorder 226 may be configured to receive information from the depth indicator 222 and record information from such components along with data obtained from the sampling and measuring instrument 208. Although shown in FIG. 2 with various discrete components, it will be appreciated that the various surface components and elements may be implemented within a single computing system or any number of computing systems different from that illustrated. That is, the configuration shown in FIG. 2 is merely for illustrative and explanatory purposes.

In operation, electrical control signals may be transmitted from the control circuits 228 to the sampling and measuring instrument 208 at a downhole location, through the conveyance device 206. The control signals may cause activation of a hydraulic pump within the hydraulic power system 210, which provides hydraulic power causing the well-engaging pad member 216 to extend or actuate to engage with a wall of the borehole 202 (e.g., formation wall, casing wall, etc.). additionally, such operation may cause the sampling probe member 218 to move laterally from the sampling and measuring instrument 208 into engagement with the earth formation 204.

Such operation may also cause engagement between the bi-directional pumping member 220 and the sampling probe member 218, depending on the configuration of the sampling and measuring instrument 208. In other embodiments, the bi-directional pumping member 220 and the sampling probe member 218 may be operationally coupled prior to deployment into the borehole 202. Once set, the sampling probe member 218 can then be actuated, deployed, or placed in fluid communication with the earth formation 204. For example, an electrical control signal from the control circuits 228 may be transmitted downhole to the sampling and measuring instrument 208 to selectively activate one or more solenoid valves within the sampling and measuring instrument 208 for the taking of a sample of fluids contained in the earth formation 204. It will be appreciated that other actuation techniques for operating a fluid extraction tool may be implemented without departing from the scope of the present disclosure.

When a fluid is extracted from a downhole formation and drawn into a sampling tool, the fluid may be interacted with to determine properties of the fluid. For example, determining the acoustic properties of downhole fluids may be desirable for several types of downhole evaluation. Such properties may be used in characterizing the fluid itself, or for use in methods for evaluating the formation, the borehole, the casing, the cement, or for previous or ongoing operations in the borehole including exploration, development, or production. Various techniques have been used to analyze downhole fluids. Such techniques may include the use of instruments for obtaining information relating to a parameter of interest in conjunction with sample chambers storing the sampled fluid for analysis or sample chambers allowing the fluid to pass through (continuously, or as directed by a flow control) for sampling, or as mounted on an exterior of a tool body of a downhole tool. Example systems may use a signal generator and sensor (which may be combined; e.g., a transducer) for determining acoustic impedance. In the well-known time of flight method, the sound speed, c, of a fluid may be determined by dividing the distance the signal traveled through the fluid by the corresponding travel time of the signal through the fluid.

One sampling and testing method is to direct acoustic energy (e.g., applying a voltage pulse to an acoustic transducer) at a fluid sample from the formation and observe a response of such applied energy. In some systems, a known material may be arranged to contact and/or interact with fluids extracted from a formation, and an interaction or response of such interaction may be observed to obtain information about the fluid. For example, the acoustic impedance of an Electrorheological (ER) material can be changed by an applied electric field. Similarly, the acoustic impedance of a Magnetorheological (MR) material can be changed by application of a magnetic field. In both cases, the applied field primarily changes the stiffness of the material, which affects the sound speed through the material. In accordance with embodiments of the present disclosure, a fluid sampling and testing system may be used to transmit acoustic waves through an ER or MR material to an interface with a fluid. The applied field may then be varied to minimize the acoustic reflection from the interface between the ER/MR material. When the ER/MR material and the fluid have the same acoustic impedance, there will be no reflection of sound at the interface. As such, by varying the applied field to the ER/MR material at the interface with a fluid allows for determining an acoustic impedance of a fluid by finding a minimum where no reflection is observed. That is, through characterization of how the acoustic impedance of the ER or MR material changes with applied field (and perhaps, with temperature and pressure as well) allows for determination of the acoustic impedance of an unknown fluid from the applied field. The characterization of the ER/MR material response to changes in applied field may be obtained from lab testing, simulations, modeling, or the like, as will be appreciated by those of skill in the art.

The obtained acoustic impedance can be combined with fluid sound speed, obtained from a secondary analyzer (e.g., sound speed sensor tool), to determine a fluid mass density, and thus determination of the fluid composition may be obtained. For example, known sound speed sensors may have resolutions as fine as 133 parts per million, and thus provide a high resolution of the sound speed. In accordance with embodiments of the present disclosure, the acoustic impedance may be determined with a resolution or accuracy better than 0.005 MRayl, which is on the order of 0.5% of formation fluid acoustic impedances ranging from 0.8 MRayl to 1.8 MRayl. Dividing a high-resolution fluid acoustic impedance, obtained from tools and systems described herein, by a high-resolution fluid sound speed (e.g., 133 ppm resolution) can yield a high-resolution fluid mass density, which is better than 0.01 g/cc. Examples of such sound speed devices may be found in U.S. Pat. No. 7,523,640, entitled "Acoustic Fluid Analyzer," granted Apr. 28, 2009, and/or U.S. Pat. No. 7,614,302, entitled "Acoustic Fluid Analysis Method," granted Nov. 10, 2009, the contents of which are incorporated herein by reference in their entireties.

Figure 3:
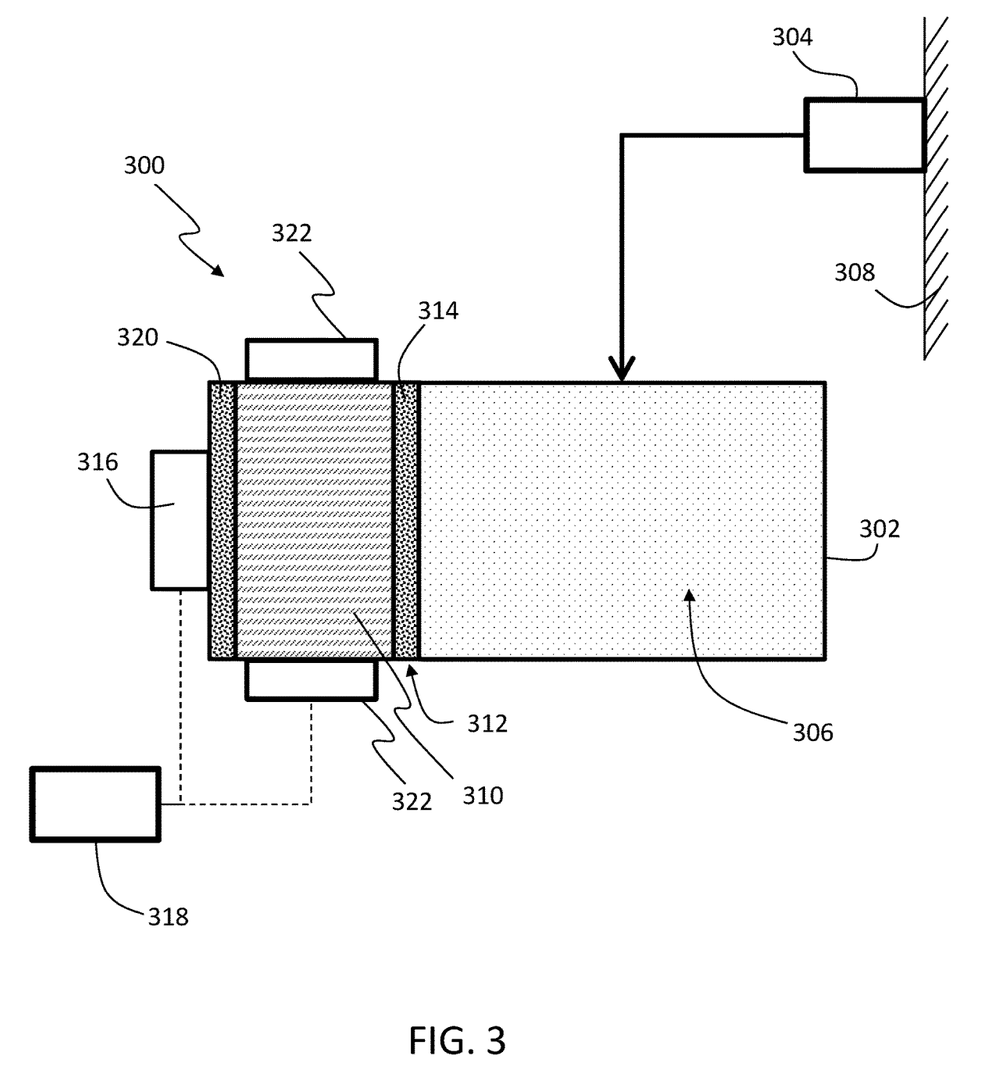
FIG. 3 is a schematic illustration of an acoustic impedance measurement tool in accordance with an embodiment of the present disclosure.

Referring now to FIG. 3, a schematic illustration of a downhole fluid sampling tool 300 in accordance with an embodiment of the present disclosure is shown. The downhole fluid sampling tool 300 may be configured within a sub or other downhole tool, such as part of a bottom hole assembly, a wireline tool, or the like. The downhole fluid sampling tool 300 is configured to receive a fluid within the downhole fluid sampling tool 300 and perform an investigation or analysis thereof. Although the downhole fluid sampling tool 300 may be arranged within or as part of a downhole tool or assembly such components and structure are not shown in FIG. 3 for clarity and simplicity. The downhole fluid sampling tool 300 may be arranged within and/or as part of the systems shown in FIGS. 1 and 2 and similar downhole tools and systems.

The downhole fluid sampling tool 300 includes a sample chamber 302 that is fluidly connected to a sampling probe member 304. In operation, the sampling probe member 304 is configured to extract a fluid 306 that is directed into the sample chamber 302 from a formation 308. With the fluid 308 within the sample chamber 302, testing and analysis of the fluid 306 may be performed. To perform testing in accordance with embodiments of the present disclosure, the fluid 306 is directed into contact with a field responsive material 310. The field responsive material 310 may be an electrorheological (ER) material or a magnetorheological (MR) material. Such materials may include, for example and without limitation, a commercial electrorheological fluid such as Rheobay®, made by Bayer AG, which consists of a dispersion of polyurethane particles in silicone oil whose average particle diameter is about 10 microns with an average electrorheological fluid density of 1.042 g/cc and the appearance of milk. Other electrorheological fluids include, for example, RheOil 3.0®, which uses Zn2+ doped polyurethane particles for improved particle suspension stability and Polyaniline-HCL. Various other ER products are manufactured by Hydraulik Technik Oberhausen GmbH, IBL Löttechnik GmbH, Behdash Chemical Co., ARCUM GmbH, BASF SE, CLN GmbH, Falcone Specialties AG, Fox-Chemicals GmbH. Examples of magnetorheological fluids include, for example, the LORD MR fluids (MRF-140G, MRF-132DG, MRF-122EG, MRF-26LF, and MRF-140BC), which respond in less than 5 milliseconds, are gray in color and redisperse easily with proper agitation and contain iron particles in the range of 1 to 20 microns and AMT-DAMPRO+ by ARUS MR TECH. Various other MR products are made by Kolektor Group, MRF Engineering, QED Technologies International, Ioniqa Technologies, Liquids Research Limited, CK Materials Lab, ArProDEC, Industrial Metal Powders, and Kurimoto Ltd. In accordance with some embodiments of the present disclosure, the electrorheological (ER) material or a magnetorheological (MR) material may be selected from materials having acoustic impedances that overlap the range of acoustic impedances of downhole fluids (e.g., oil, water, gas, etc.). It will be appreciated that the acoustic impedances of downhole fluids will vary based on temperature and pressure.

In some configurations, the fluid 306 obtained from the formation 308 may be arranged in direct contact with the field responsive material 310 at an interface 312. In other embodiments, and as shown in FIG. 3, an optional fluid interface member 314 may be arranged at the interface 312 to separate the field responsive material 310 from the fluid 306. The optional fluid interface member 314 may be formed from a material with roughly the same acoustic impedance as the test fluid (e.g, oil in the region of 0.9 MRayls or water in the region of 1.5 MRayls, which numbers can increase with pressure and decrease with temperature) such as a rigid, high-temperature, chemically-resistant plastic, polymethylpentene (TPX by Mitsui, 1.84 MRayls) or a flexible, high-temperature, chemically-resistant Dow Silastic Rubber GP45 (1.16 MRayl, 45 durometer) or Dow Silastic GP70 (1.3 MRayl, 70 durometer) in order to minimize reflections by the fluid interface member 314 and/or an optional transducer interface member 320, described below. The interface members 314, 320 may be made very thin relative to the wavelength of sound so that the interface members 314, 320 have negligible effect upon acoustic waves passing therethrough. That is, the thinness of the interface members 314, 320 may be such that the interface members 314, 320 are essentially not present with respect to acoustic waves, and thus the downhole fluid sampling tool 300 may function as though the field responsive material 310 was in direct contact with the fluid 306 at interface 312. In some configurations, the fluid interface member 314 may be a film or membrane.

Opposite the sample chamber 302, with respect to the field responsive material 310, is an acoustic transducer 316. The acoustic transducer 316 is configured to direct acoustic energy into and through the field responsive material 310 toward the sample chamber 302 and the fluid 306 contained therein. As acoustic energy interacts with the materials at the interface 312, a portion of the acoustic energy will be reflected back to the acoustic transducer 316 where the reflected acoustic energy may be detected and analyzed to determine an acoustic impedance of the fluid 306. The acoustic transducer 316 is operably connected to a controller 318 that can energize the acoustic transducer 316 to transmit acoustic energy into and through the field responsive material 310 toward the interface 312 with the fluid 306. As shown, for ER or MR liquids, an optional transducer interface member 320 may be arranged between the acoustic transducer 316 and the field responsive material 310 to keep the liquid contained. To maximize acoustic energy transfer, the optional transducer interface member 320 may be formed from material having an acoustic impedance that is the square root of the product of the impedance of the acoustic transducer 316 (e.g., 33 MRayl, such as for PZT) and the acoustic impedance of the field responsive material 310 (e.g., ranging from 0.8 to 2 MRayl), which corresponds to an acoustic impedance of approximately 6.8 MRayls (e.g., between 5.1 MRayls and 8.1 MRayls). Some material choices for the transducer interface member 320 may include, for example and without limitation, a 5.46-5.92 MRayl epoxy E-Solder by Von Roll Isola of New Haven, CT, a 4.68 MRayl epoxy, LOCTITE ABLESTIK 16-1LV, and/or a 4.39 MRayl Celazole® (Polybenzimidazole—PBI) 400 F thermoplastic by Aetna Plastics. In some configurations, the transducer interface member 320 may be a film or membrane.

Whether the field responsive material 310 is selected to be a liquid or solid, the downhole fluid sampling tool 300 may include the interface members 314, 320. The interface members 314, 320, in the case of a liquid field responsive material 310, may be arranged as containment walls or partitions to house or contain the liquid material. Such interface members 314, 320 may also be implemented in the case of a solid field responsive material 310, where the interface members 314, 320 may optionally be included to provide a barrier to prevent direct contact between the fluid 306 in the sample chamber 302

Because the acoustic impedance of the field responsive material 310 can be known and the reflected energy fraction $(R=(Z_2-Z_1)^2/(Z_2+Z_1)^2)$ at the interface 312 is based on the contrast between the acoustic impedance of the field responsive material 310 ($Z_2$) and the acoustic impedance of the fluid 306 ($Z_1$), it is possible to determine the acoustic impedance of the fluid 306. A measure of the reflected energy can be obtained as a cumulative sum of squares (CSS) of the reflected acoustic amplitudes over a predefined period of time or time interval. To enable a high-resolution determination of the acoustic impedance of the fluid 306, the controller 318 is operably connected to a field generator 322 (e.g., electric or magnetic field generator). As shown, the field generator 322 may be configured as one or more elements arranged in contact with the field responsive material 310 or at least arranged such that a field generated by the field generator 322 will interact with the field responsive material 310 to cause changes in the acoustic properties of the field responsive material 310.

The field generator 322 is a device configured to generate a field that is selected to cause a change in a property of the field responsive material 310. For example, when the field responsive material 310 is an electrorheological (ER) material, the field generator 322 may be configured to generate an electric field that is applied to the field responsive material 310 to cause a known change in the acoustic impedance of the field responsive material 310. For example, for an ER field responsive material 310, the field generator 322 may be configured as a pair of electrodes at different voltages to generate an electric field across the ER field responsive material 3110. Similarly, if the field responsive material 310 is a magnetorheological material, the field generator 322 may be configured to generate a magnetic field that is applied to the field responsive material 310 to cause a known change in the acoustic impedance of the field responsive material 310. For example, for an MR field responsive material 310, the field generator 322 may be configured as a pair of wire coils that may have current passed therethrough to generate a magnetic field across the MR field responsive material 310. In accordance with various embodiments of the present disclosure, the field responsive material 310 may be in the form of a liquid or a solid. For ER or MR liquids, the interface members 314, 320 may be configured to keep the ER or MR liquid contained relative to the sample chamber 306 and the acoustic transducer 316. Solid materials may also be used, without limitation, such as ER or MR elastomers.

By varying the applied field from the field generator 322, the acoustic impedance of the field responsive material 310 is changed. When the acoustic impedance of the field responsive material 310 and the fluid 306 are different, the acoustic energy transmitted from the acoustic transducer 316 will reflect from the interface 312 and such reflection may be detected at the acoustic transducer 316. In contrast, when the field responsive material 310 and the fluid 306 have the same acoustic impedance, there will be no reflection of acoustic energy at the interface 312. Accordingly, by varying the applied field from the field generator 322, the acoustic impedance of the field responsive material 310 may be changed and amplitudes of reflected acoustic energy may be monitored at the acoustic transducer 316. Although shown and described as a single source and receiver at the acoustic transducer 316, those of skill in the art will appreciate that the transmitter and receiver aspects may be arranged in separate/discrete elements or components, without departing from the scope of the present disclosure.

The controller 318 may be configured to control operation of both the acoustic transducer 316 and the field generator 322. The controller 318 may be an electronic component, system, or part of an electronic component or system that is deployed downhole. The controller 318 may include various electronic and/or electrical components for controlling operation of the acoustic transducer 316 and the field generator 322. As such, the controller 318 may include one or more processors, one or more memory or storage components, input/output devices, a power source or connection to other downhole power source, buses, and other electronic components or elements as will be appreciated by those of skill in the art. The processor of the controller 318 may be configured to execute commands to send instructions to the acoustic transducer 316 and the field generator 322 and receive data from one, or both, of the acoustic transducer 316 and the field generator 322. In some configurations, the acoustic transducer 316 may operate as both an acoustic transmitter to transmit acoustic energy toward the fluid 306 in the sample chamber 306 and after such transmission (e.g., a fraction of a second later), the acoustic transducer 316 may operate as an acoustic receiver to detect reflected acoustic energy. The controller 318 may be configured to receive signal data (e.g., reflective acoustic signal strength data) from the transducer 316 and process and/or otherwise analyze such data.

In some embodiments, the controller 318 may be configured to control the changes in field applied by the field generator 322 to the field responsive material 310 and to receive acoustic reflection data from the acoustic transducer 316 in response to reflected acoustic energy at the interface 312. As noted, one or more interface members 314, 320 may be included. The interface members 314, 320 may be selected to have minimal or no impact upon acoustic energy transmission or may have a known impact that may be accounted for when calculating the acoustic energy levels of the reflected acoustic energy. Because no reflection occurs when the acoustic impedance of the field responsive material 310 and the fluid 306 are the same (and interface members 314, 320 having negligible impact on transmission and/or reflection), the controller 318 may be configured to cause changes in the acoustic impedance of the field responsive material 310 by changing the applied field from the field generator 322. In accordance with some configurations and operations of the present disclosure, small amounts of spurious sheer or other types of acoustic waves may be generated along with the intended acoustic compressional waves and these spurious waves may be detected by the acoustic transducer 316 (or another detector) even when the compressional acoustic impedance matches ($Z_2=Z_1$). Therefore, searching for a minimum reflection as compared to zero/no refection may be implemented in some embodiments of the present disclosure.

The controller 318 may then change the field to achieve a minimum reflection of acoustic energy from the interface 312. That is, when the minimum reflection is detected (including no detected reflection), then the acoustic impedance of the field responsive material 310 matches the acoustic impedance of the fluid 306 and thus the acoustic impedance of the fluid 306 may be determined. With a known acoustic impedance and a known sound speed of the fluid 306, such as from another tool or sensor, the density of the fluid may be accurately determined.

Figure 4:
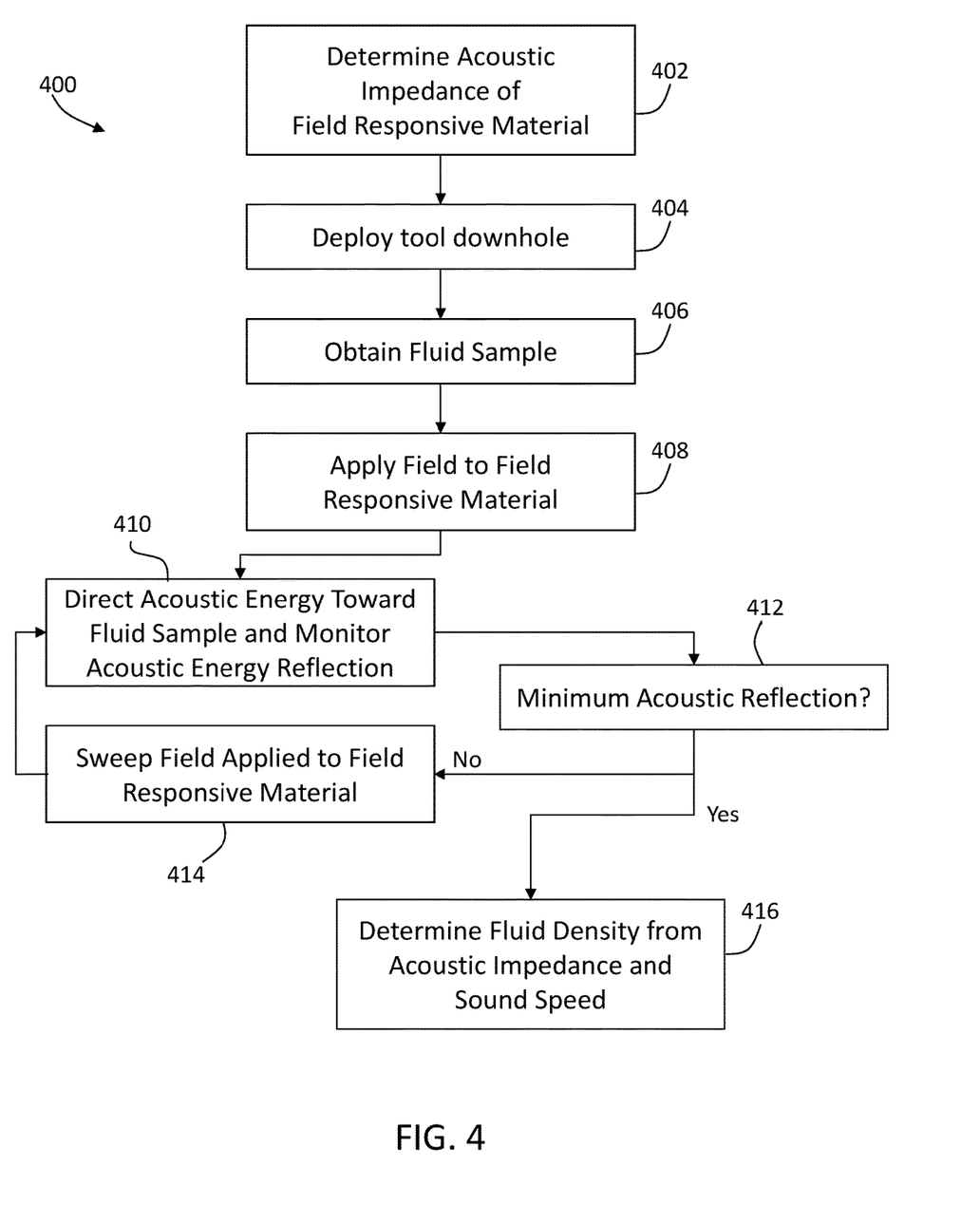
FIG. 4 is a flow process for performing fluid analysis in accordance with an embodiment of the present disclosure.

Referring now to FIG. 4, a schematic flow process 400 in accordance with an embodiment of the present disclosure is shown. The flow process 400 may be performed, in part, by a controller or other component associated with a downhole fluid sampling tool, such as shown and described with respect to FIG. 3, or other similar devices and/or systems.

At block 402, acoustic impedance of a field responsive material is determined. The determination of the acoustic impedance of the field responsive material may be performed in a laboratory setting, from modeling, simulations, prior downhole data analysis, or other source. The data associated with the acoustic impedance of the field responsive material includes the acoustic impedance of the field responsive material when subjected to different field applications. If the field responsive material is an electrorheological material, the initial data may be obtained, for example, by applying different electric field strengths to the material and measuring the acoustic impedance thereof. If the field responsive material is a magnetorheological material, the initial data may be obtained, for example, by applying different magnetic field strengths to the material and measuring the acoustic impedance thereof. The testing or modeling may be performed with respect to temperature and/or pressure changes which may be present in downhole environments. The operation performed at block 402 is performed to establish a base set of data of the acoustic impedance of the field responsive material. This characterization data for the acoustic impedance ($Z_2$) of the field responsive material 310, as a function of (electric or magnetic) field strength, pressure, and temperature, may be stored in a memory associated with a controller of a downhole fluid sampling tool in accordance with an embodiment of the present disclosure. This data may subsequently be used to estimate the acoustic impedance ($Z_2$) of the field responsive material 310 in a downhole environment and operation directly from pressure and temperature data in combination with a known applied field strength (e.g., magnetic or electric field).

At block 404, the downhole fluid sampling tool is deployed downhole. The downhole fluid sampling tool includes a controller, with control and data processing/storage elements, a sampling probe member, a sample chamber, a field responsive material, an acoustic transducer, and a field generator. The downhole fluid sampling tool may be arranged within a bottomhole assembly along a drill string, a wireline tool, or other tool or system that may be deployed into and through a wellbore or borehole formed through an earth or subsurface formation. The downhole fluid sampling tool will be positioned at a location near a formation of interest and actuated or operated to engage with a wall of the borehole. At the appropriate location for fluid sampling, one or more additional downhole tools and/or sensors may be used to obtain temperature and pressure information.

At block 406, the sampling probe member is operated to extract a fluid sample from a formation. The fluid sample is collected into a sample chamber of the downhole fluid sampling tool. When the fluid sample is contained in the same chamber, the fluid sample will be in contact with the field responsive material or in contact with a fluid interface member that is in contact with the field responsive material.

At block 408, a field generator is operated to generate and apply an electromagnetic field to the field responsive material. In accordance with some various embodiments of the present disclosure, the applied field may be a magnetic field or an electric field, or a combination thereof, depending on the specific configuration of the system employed. As the field is applied, the acoustic impedance of the field responsive material will be controlled or tuned to a specific, known acoustic impedance based on the data obtained at block 402. The applied field may be based, in part, on temperature and pressure information obtained by other sensors and/or tools (e.g., at block 404). In some configurations, the applied electric or magnetic field strength, in combination with the pressure and temperature information, are used to achieve a specific and known acoustic impedance within the field responsive material.

At block 410, with a known acoustic impedance of the field responsive material achieved by application of the known field from the field generator, an acoustic transducer is operated to direct acoustic energy toward the interface between the field responsive material and the fluid in the sample chamber. Simultaneously, at block 410, reflections of acoustic energy from the interface between the field responsive material and the fluid in the sample chamber is monitored. The monitoring of the reflected acoustic signals or reflected acoustic energy may be detected at an appropriate sensor, such as a dedicated sensor, a transducer (e.g., transmitter and receiver), or as part of some other sensor assembly, array, or system, as will be appreciated by those of skill in the art.

At block 412, a process to determine if a minimum acoustic reflection is detected is performed. As discussed above, when the acoustic impedance of the field responsive material and the fluid in the sample chamber are the same, there will be no reflection of acoustic energy. The initial application of energy at block 408 may be selected to achieve acoustic impedance parity with a desired fluid of interest (e.g., water, oil, gas, etc.). As such, on the first application at block 408 and monitoring at block 410, in ideal conditions, the minimum acoustic reflections may be equal to zero at block 412. However, because ideal conditions are difficult to achieve in real world applications, the process 400 may be configured to perform a check or minimizing operation to find the minimum acoustic reflection by actively changing the acoustic impedance of the field responsive material through changing the applied field.

At block 414, the field applied to the field responsive material is changed, thus changing the acoustic impedance of the field responsive material. The change in field strength may be performed in a stepwise manner, increasing by a known increment in either increase or decrease.

The process 400 then returns to block 410 and acoustic energy is applied and monitored and at block 412 a minimum acoustic reflection is checked. If the reflective acoustic energy increased from a prior application (block 410), then the system will know that the adjustment of field energy was in the wrong direction, and it is determined that the new application is not a minimum, and the flow process returns to block 414 to again change the acoustic impedance of the field responsive material. In contrast, if the reflective acoustic energy decreased from a prior application (block 410), then the system will know that the adjustment of field energy was in the correct direction. The process 400 will then performed blocks 410, 412, 414 in a cyclic manner to find a minimum acoustic reflection at the interface between the field responsive material and the fluid in the sample chamber.

The process and cyclic manner of blocks 408-414 of process 400 may be performed repeatedly to obtain a minimum reflection of acoustic energy at the interface between the field responsive material and the fluid in the sample chamber. The repeated cycling of the process may be based on a first level step function, increasing or decreasing at a known or fixed increment. The process may be performed cyclically with decreasing step sizes to increase the accuracy of the measurement.

In one non-limiting example, downhole, for a given temperature and pressure, the field strength is swept to vary acoustic impedance of the field responsive material from approximately 0.8 to 1.8 Mrayls. This range of acoustic impedance is selected to span the acoustic impedances of various fluids that may be present downhole. For example, a sweep between 0.8 and 1.8 Mrayls would span both oil (about 0.9 Mrayls) and water (about 1.5 Mrayls). As such, a determination of field strength for a minimum reflection from an interface between a field responsive material (e.g., ER or MR) and a fluid within a sample chamber may be made. This process may be iterated by sweeping the field strength in ever smaller ranges around a field strength associated with a previous minimum reflection. In one non-limiting example, a first cycle may be performed using a step-size of 0.25 Mrayls, and when a minimum at that step-size is determined, the step-size may be decreased, such as to 0.1, 0.05, etc., depending on the specific fluids, required or necessary accuracy, margins of error, etc. The smallest step-size may be selected or predetermined based on pre-existing information (e.g., at block 402). When a minimum is determined at block 412, the process 400 may proceed further.

At block 416, with a minimum acoustic reflection determined, the acoustic impedance of the field responsive material may be estimated as the acoustic impedance of the fluid in the sample chamber, and thus the acoustic impedance of the fluid is measured. From this acoustic impedance, $Z_1$, and a sound speed, $c_1$, of the fluid (determined from another tool or sensor), the density, $\rho_1$, of the fluid sample may be calculated from:

$$Z_1 = \rho_1 * c_1 \quad (1)$$

where Z is the acoustic impedance of a fluid, $\rho$ is the fluid density, and c is the speed sound of the fluid.

At block 416, the minimum acoustic reflection may be processed to obtain an accurate estimate of the fluid acoustic impedance. For example, a polynomial may be fit to final sweep data ("yes" at block 412) and interpolation performed where a first derivative of a polynomial fit crosses zero to achieve a resolution of fluid acoustic impedance much better than the field strength step size during sweep (block 414). For example, rather than assigning the acoustic impedance that equates to the minimum acoustic reflection at block 412, the process may include taking all acoustic impedance estimates from the first sweep to the final sweep and a polynomial is applied to all the collected data to estimate a minimum that may not be possible to obtain through the sweep steps at block 414. That is, a measured data point, although close to a match between the field responsive material and the fluid in the sample chamber, may not represent the absolute minimum, and thus may not be as accurate a measurement of fluid acoustic impedance than may be achieved through processing of such data. By applying a best fit (e.g., polynomial fit) to the data, a minimum may be more accurately determined than merely the minimum datapoint collected from the iterative operation of blocks 410-414 of process 400. In accordance with some embodiments of the present disclosure, using a polynomial fit to interpolate a minimum that occurs between the endpoints of a sweep step may improve the resolution by a factor of 5 or 10 over simply using the sweep interval endpoint that is closest to a minimum.

The application of the polynomial fit may be an optional step, if time is of a concern. However, if time is not of issue, then repeated smaller and smaller increments of steps around a minimum may be applied, and thus a direct measurement (rather than a best-fit) of the minimum acoustic reflection may be obtained, and thus such a measurement of the acoustic impedance of the fluid in the sample chamber. However, if time is a concern, or direct measurement is not used with such an iterative sampling, the best-fit operation may be performed. For example, a zero crossing of the first derivative of a fast Savitzky-Golay polynomial fit to evenly-spaced acoustic impedance data may be performed to get an interpolated value that may have five to ten times higher resolution than the step size itself (depending upon last selected step size in process 400). It will be appreciated that other fit parameters and polynomials may be employed without departing from the scope of the present disclosure.

During the calculation of block 416, the determined acoustic impedance of the fluid in the sample chamber is combined with the sound speed to determine a fluid mass density. Prior sound speed measurements of a particular fluid may be of resolutions of 500 parts per million (ppm) or less, such as 250 ppm, 150 ppm, etc. (e.g., 133 ppm has been obtained in known oilfield measurements). In accordance with embodiments of the present disclosure, the acoustic impedance of the fluid sample may be determined to within 0.005 MRayl or better. Accordingly, through use of a high-resolution sound speed and a high-resolution acoustic impedance, a high-resolution fluid mass density may be obtained. With such a high-resolution fluid mass density, a highly accurate determination of the fluid in the sample chamber my be obtained. Accordingly, a highly accurate estimate determination of the fluid in a downhole formation may obtained.

Advantageously, embodiments of the present disclosure are directed to mechanisms, systems, and processes for measuring an acoustic impedance of a downhole fluid. In accordance with embodiments of the present disclosure, a highly accurate measurement of the acoustic impedance of a fluid obtained from a formation may be made. This measurement can be combined with a speed sound measurement for the same fluid, and thus a fluid mass density may be obtained. Advantageously, embodiments of the present disclosure are directed to a wholly acoustic process for measuring acoustic impedance and for determining a fluid mass density therefrom.

Set forth below are some embodiments of the foregoing disclosure:

Embodiment 1: A downhole tool for measuring properties of a fluid, the downhole tool comprising: a sample chamber configured to receive the fluid; a field responsive material arranged with an interface between the field responsive material and the fluid in the sample chamber, wherein the field responsive material is tunable to change an acoustic impedance of the field responsive material in response to application of an applied field; a field generator arranged in relation to the field responsive material, the field generator configured to generate and apply a field to the field responsive material; and an acoustic transducer arranged to direct acoustic energy into and through the field responsive material toward the interface between the field responsive material and the fluid and configured to detect reflections of acoustic energy that reflect from the interface.

Embodiment 2: The downhole tool of any preceding embodiment, further comprising: a controller in operable communication with the field generator, the controller configured to cause generation of different strength fields from the field generator.

Embodiment 3: The downhole tool of any preceding embodiment, wherein the controller is configured to perform a sweep operation to change the field strength to determine a minimum reflection of acoustic energy from the interface.

Embodiment 4: The downhole tool of any preceding embodiment, wherein the field responsive material is a magnetorheological material.

Embodiment 5: The downhole tool of any preceding embodiment, wherein the field generator is configured to generate a magnetic field that is applied to the magnetorheological material to change an acoustic impedance thereof.

Embodiment 6: The downhole tool of any preceding embodiment, wherein the field responsive material is an electrorheological material.

Embodiment 7: The downhole tool of any preceding embodiment, wherein the field generator is configured to generate an electric field that is applied to the electrorheological material to change an acoustic impedance thereof.

Embodiment 8: The downhole tool of any preceding embodiment, further comprising: a fluid interface member arranged at the interface between the field responsive material and the fluid in the sample chamber.

Embodiment 9: The downhole tool of any preceding embodiment, further comprising: a transducer interface member arranged at an interface between the acoustic transducer and the field responsive material.

Embodiment 10: The downhole tool of any preceding embodiment, further comprising: a sampling probe member arranged to extract a fluid from a downhole formation and direct said extracted fluid to the fluid sample chamber.

Embodiment 11: A method for determining fluid properties with a downhole tool having a sample chamber, a field responsive material, an acoustic transducer, and a field generator, the method comprising: filling the sample chamber with a fluid; applying a field to the field responsive material, using the field generator, to cause an acoustic impedance of the field responsive material to change to a predetermined acoustic impedance; directing acoustic energy through the field responsive material, from the acoustic transducer to an interface between the field responsive material and the fluid in the sample chamber; monitoring acoustic energy reflections from the interface to determine an acoustic impedance of the fluid in the sample chamber; changing the applied field to alter the acoustic impedance of the field responsive material; determining an acoustic impedance of the field responsive material that has a minimum amount of acoustic energy reflection; and obtaining an acoustic impedance of the fluid in the sample chamber from the determined acoustic impedance of the field responsive material.

Embodiment 12: The method of any preceding embodiment, wherein the field responsive material is a magnetorheological material.

Embodiment 13: The method of any preceding embodiment, wherein the field generator is configured to generate a magnetic field that is applied to the magnetorheological material to change an acoustic impedance thereof.

Embodiment 14: The method of any preceding embodiment, wherein the field responsive material is an electrorheological material.

Embodiment 15: The method of any preceding embodiment, wherein the field generator is configured to generate an electric field that is applied to the electrorheological material to change an acoustic impedance thereof.

Embodiment 16: The method of any preceding embodiment, wherein the steps of applying a field, directing acoustic energy, and monitoring acoustic energy reflections is performed in a stepwise manner with the changing of the applied field to find a minimum reflection of the acoustic energy.

Embodiment 17: The method of any preceding embodiment, further comprising: measuring a sound speed of the fluid using a sound speed sensor tool; and calculating a fluid mass density from the measured sound speed and the obtained acoustic impedance of the fluid in the sample chamber.

Embodiment 18: The method of any preceding embodiment, further comprising: obtaining acoustic reflection information during monitoring of the acoustic energy reflections; applying a best fit polynomial to the acoustic reflection information; and obtaining a first derivative of the best fit polynomial and determining where said first derivative crosses zero to obtain the fluid acoustic impedance of the fluid in the sample chamber.

Embodiment 19: The method of any preceding embodiment, wherein the applied field is selected to achieve an acoustic impedance of the field responsive material between 0.8 Mrayls and 1.8 Mrayls.

Embodiment 20: The method of any preceding embodiment, wherein the acoustic impedance of the fluid in the sample chamber is equal to the acoustic impedance of the field responsive material when the acoustic energy reflections are at a minimum.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first,"

"second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A downhole tool for measuring properties of a fluid, the downhole tool comprising:
   a sample chamber configured to receive the fluid;
   a field responsive material arranged with an interface between the field responsive material and the fluid in the sample chamber, wherein the field responsive material is tunable to change an acoustic impedance of the field responsive material in response to application of an applied field;
   a field generator arranged in relation to the field responsive material, the field generator configured to generate and apply a field to the field responsive material; and
   an acoustic transducer arranged to direct acoustic energy into and through the field responsive material toward the interface between the field responsive material and the fluid and configured to detect reflections of acoustic energy that reflect from the interface.

2. The downhole tool of claim 1, further comprising:
   a controller in operable communication with the field generator, the controller configured to cause generation of different strength fields from the field generator.

3. The downhole tool of claim 2, wherein the controller is configured to perform a sweep operation to change the field strength to determine a minimum reflection of acoustic energy from the interface.

4. The downhole tool of claim 1, wherein the field responsive material is a magnetorheological material.

5. The downhole tool of claim 4, wherein the field generator is configured to generate a magnetic field that is applied to the magnetorheological material to change an acoustic impedance thereof.

6. The downhole tool of claim 1, wherein the field responsive material is an electrorheological material.

7. The downhole tool of claim 6, wherein the field generator is configured to generate an electric field that is applied to the electrorheological material to change an acoustic impedance thereof.

8. The downhole tool of claim 1, further comprising:
   a fluid interface member arranged at the interface between the field responsive material and the fluid in the sample chamber.

9. The downhole tool of claim 1, further comprising:
   a transducer interface member arranged at an interface between the acoustic transducer and the field responsive material.

10. The downhole tool of claim 1, further comprising:
    a sampling probe member arranged to extract a fluid from a downhole formation and direct said extracted fluid to the fluid sample chamber.

11. A method for determining fluid properties with a downhole tool having a sample chamber, a field responsive material, an acoustic transducer, and a field generator, the method comprising:
    filling the sample chamber with a fluid;
    applying a field to the field responsive material, using the field generator, to cause an acoustic impedance of the field responsive material to change to a predetermined acoustic impedance;
    directing acoustic energy through the field responsive material, from the acoustic transducer to an interface between the field responsive material and the fluid in the sample chamber;
    monitoring acoustic energy reflections from the interface to determine an acoustic impedance of the fluid in the sample chamber;
    changing the applied field to alter the acoustic impedance of the field responsive material;
    determining an acoustic impedance of the field responsive material that has a minimum amount of acoustic energy reflection; and
    obtaining an acoustic impedance of the fluid in the sample chamber from the determined acoustic impedance of the field responsive material.

12. The method of claim 11, wherein the field responsive material is a magnetorheological material.

13. The method of claim 12, wherein the field generator is configured to generate a magnetic field that is applied to the magnetorheological material to change an acoustic impedance thereof.

14. The method of claim 11, wherein the field responsive material is an electrorheological material.

15. The method of claim 14, wherein the field generator is configured to generate an electric field that is applied to the electrorheological material to change an acoustic impedance thereof.

16. The method of claim 11, wherein the steps of applying a field, directing acoustic energy, and monitoring acoustic energy reflections is performed in a stepwise manner with the changing of the applied field to find a minimum reflection of the acoustic energy.

17. The method of claim 11, further comprising:
measuring a sound speed of the fluid using a sound speed sensor tool; and
calculating a fluid mass density from the measured sound speed and the obtained acoustic impedance of the fluid in the sample chamber.

18. The method of claim 11, further comprising:
obtaining acoustic reflection information during monitoring of the acoustic energy reflections;
applying a best fit polynomial to the acoustic reflection information; and
obtaining a first derivative of the best fit polynomial and determining where said first derivative crosses zero to obtain the fluid acoustic impedance of the fluid in the sample chamber.

19. The method of claim 11, wherein the applied field is selected to achieve an acoustic impedance of the field responsive material between 0.8 Mrayls and 1.8 Mrayls.

20. The method of claim 11, wherein the acoustic impedance of the fluid in the sample chamber is equal to the acoustic impedance of the field responsive material when the acoustic energy reflections are at a minimum.

\* \* \* \* \*